Sept. 7, 1954

H. E. HAYNES

ELECTRON TUBE CIRCUIT FOR SIMULATING PHOTOGRAPHIC PROCESS

Filed Sept. 29, 1951

2,688,693

INVENTOR

Harold E. Haynes

BY Morris A. Rabkin

ATTORNEY

Patented Sept. 7, 1954 2,688,693

UNITED STATES PATENT OFFICE 2,688,693

ELECTRON TUBE CIRCUIT FOR SIMULATING PHOTOGRAPHIC PROCESS

Harold E. Haynes, Haddonfield, N. J., assignor to Radio Corporation of America, a corporation of Delaware Application September 29, 1951, Serial No. 248,958

10 Claims. (Cl. 250—27)

Figure 1:
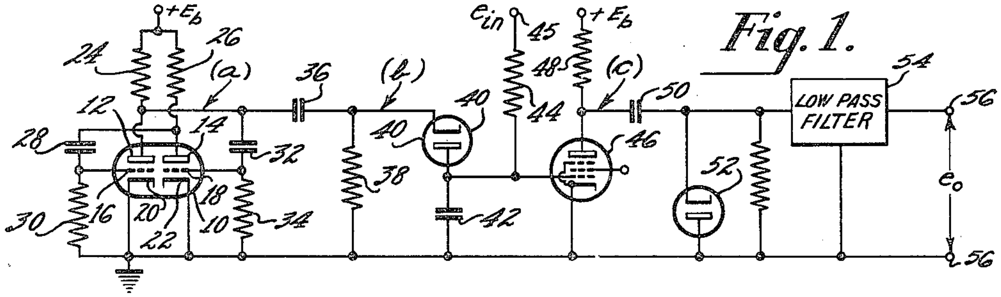

This invention relates to circuits and methods for simulating the photographic process wherein a positive image is produced from a negative image, or vice versa. More particularly, the invention relates to a circuit and method which produce an output voltage which is proportional to the reciprocal of the input voltage for application in a system used to produce a negative image on a kinescope which will, when photographed, give a positive with the correct tonal rendition.

It is sometimes desired to photograph a video recording appearing on the screen of a kinescope. In order to produce a direct positive photograph, it has been proposed merely to reverse the polarity of the video signal applied to the kinescope being photographed. This procedure, however, does not produce a negative kinescope image which will in turn, produce a positive with proper tonal values when photographed. Merely reversing the polarity of the video signal does not produce an electrical equivalent of the photographic process, as will be explained hereinafter. By providing a circuit which simulates the photographic process, the present invention overcomes this difficulty.

Another situation for the use of the circuit of this invention would be the case where a negative is to be scanned by a low speed flying spot system, and recorded on the screen of a kinescope as a positive. Such a situation would occur if color-separation negatives were to be made directly by the flying spot method from a color negative such as the "Ektacolor" material of the Eastman Kodak Company.

The reason for the reciprocal relation is as follows:

The optical transmission for photographic emulsions, as, for example, a negative transparency, is related to exposure, over a considerable range, by the equation, $$\log \frac{1}{T} = \gamma \log E + K_1 \quad (1)$$

where T is relative transmission, E is exposure, $\gamma$ is the "gamma," or contrast factor, under the particular conditions, and $K_1$ is a constant. Rewritten, Equation 1 becomes $$T = \frac{1}{K_1 E^\gamma} \quad (2)$$

If, for the sake of simplicity, the case is taken where $\gamma=1$, then $$T = \frac{1}{K_1 E} \quad (3)$$

In the usual positive negative photographic process, the positive is exposed, at each point, in proportion to the transmission of light through the negative; that is, for the positive, $$E_p = K_2 T_n \quad (4)$$

where subscript $p$ represents positive, subscript $n$ represents negative, and $K_2$ is a constant.

Substituting Equation 2 in the latter equation, $$E_p = \frac{K_2}{K_1 E_g^{\gamma n}} \quad (5)$$

and then $$T_p = \frac{1}{K_3 E_p^{\gamma p}} = \frac{1}{K_3\left(\frac{K_2}{K_1 E_n^{\gamma n}}\right)^{\gamma p}} = K_4 E_n^{\gamma n \gamma p} \quad (6)$$

where $K_3$ and $K_4$ are constants.

This is the familiar relation wherein $$T_p = \text{constant } X E_n^{\gamma_0}$$

where $\gamma_0$ is the "gamma product" of the positive and negative processes. It, therefore, follows that if one of the two photographic steps is dispensed with, the complementary electrical change must be of the nature of a single photographic process as expressed by Equation 2. Since values of $\gamma \neq 1$ can be introduced elsewhere by known methods, it is valid to say that the basic function is to apply to the kinescope a signal whose instantaneous value is proportional to the reciprocal of the normal signal.

It is, therefore, an important object of this invention to provide an improved circuit which will simulate the above described photographic process.

It is another object of this invention to provide in a photographic system, a circuit which produces an output voltage which is proportional to the reciprocal of the input voltage representing a subject to be photographed.

Still another object of this invention is to provide a circuit which provides an electrical equivalent to the relation between the exposure and the optical transmission of a photographic emulsion.

A further object of this invention is to provide a circuit for use with a low-speed flying-spot scanning system wherein an image transparency is scanned and recorded on the screen of a kinescope in its proper negative form.

Still a further object of the present invention is to provide a circuit for use in a system for making corrected color-separation negatives.

According to the invention, these and other objects and advantages are attained in a circuit comprising means for producing a regular train of short pulses, means for differentiating these pulses so that the negative peaks thereof effect the conduction of a diode and charge a capacitor negatively in the plate circuit of said diode. An impedance in series with said capacitor applies a fluctuating unidirectional positive signal voltage thereto and discharges said capacitor at a rate proportional to the amplitude of the signal voltage. The common junction of said impedance and said capacitor is connected to the grid of an electron tube having a sharp cut-off characteristic and effects conduction therethrough when said capacitor is discharged to a potential just above cut-off, whereby an output voltage wave at the anode of said tube is produced that is proportional to the reciprocal of said signal voltage. This latter voltage wave may, in turn, be applied to a kinescope used in a flying-spot scanner system. The resultant negative kinescope image, when photographed, will give a positive of desired tonal rendition.

The invention also resides in the methods having the features hereafter described and claimed.

For a more detailed understanding of the invention, reference is made to the accompanying drawings, in which similar reference characters are applied to similar elements, and in which Fig. 1 is a schematic diagram of a preferred embodiment of the invention; and Figs. 2*a*, 2*b*, 2*c*, 3*a*, 3*b*, 4 and 5 are explanatory figures referred to in the discussion of the circuit of Fig. 1.

Referring to Fig. 1, there is shown a duo-triode tube 10 connected so as to function as a multivibrator of the conventional type to generate a square wave as explained in the Radio Engineers Handbook by F. E. Terman, 1943, p. 512. The tube 10 has two anodes 12, 14, two grids 16, 18, and two cathodes 20, 22. A source of plate voltage $E_b$ is connected to the anodes 12, 14 through the load resistors 24, 26, respectively. The anode 14 is connected to the grid 16 through a capacitor 28. The grid 16 is also connected to ground through a resistor 30. The anode 12 is connected to the grid 18 through a capacitor 32. The grid 18 is also connected to ground through a resistor 34. Both cathodes 20 and 22 are grounded. The constants of the components of the circuit associated with the tube 10 are so chosen that the output voltage wave form at the point (*a*) is a regular train of short voltage pulses or square waves of the form shown in Fig. 2*a*. The frequency of these pulses should be higher than the highest frequency component of the fluctuating unidirectional video signal input voltage $e_{in}$.

Figure 2A:
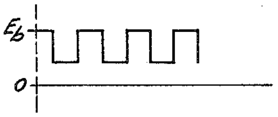
Figure 2B:
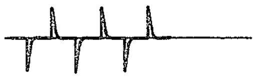

Shunted across the anode 12 and ground is a differentiating circuit comprising a capacitor 36 and a resistor 38. One end of the capacitor 36 is connected to the anode 12 and the other end of the capacitor 36 is connected to ground through the resistor 38. The regular voltage pulses of the multivibrator 10 are differentiated across the resistor 38 to produce pulses of a peaked wave form, at point (*b*), as shown in Fig. 2*b*.

Figure 3A:
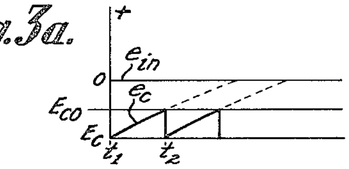

A rectifier diode 40, in series with a storage capacitor 42 is shunted across the resistor 38. The cathode of the diode 40 is connected to the common junction between the resistor 38 and the capacitor 36. The anode of the diode 40 is connected to ground through a capacitor 42. The negative going voltage peaks of the differentiated wave form shown in Fig. 2*b* cause the diode 40 to conduct and charge the capacitor 42 to a maximum negative voltage $E_c$ (Fig. 3*a*). The capacitor 42 is in series with an impedance comprising a resistor 44, and discharges therethrough towards zero when the diode 40 is not conducting. A terminal 45 of the resistor 44 is the point for the insertion of the positive video signal input voltage $e_{in}$. The magnitude of the voltage $E_c$ is nearly equal to the peak to peak amplitude of the wave at the anode 12 of the tube 10, provided the capacitor 42 is much smaller than the capacitor 36, and the resistor 38 is much smaller than the resistor 44. Under these conditions, the wave form at point (*b*) is symmetrical about a voltage value nearly equal to zero, as shown in Fig. 2*b*, and the capacitor 42 is charged substantially to the peak value of the wave.

The common junction between the resistor 44 and the capacitor 42 is connected to the control grid of an electron tube 46 having a sharp cut off characteristic. The tube 46 may be of the pentode type. The anode of the tube 46 is connected to a source of plate voltage $E_b$ through a load resistor 48, and the cathode of the tube 46 is grounded. When the voltage across the capacitor 42, which is charged to a greater negative voltage than the cut-off voltage necessary for the tube 46, during each cycle of the multivibrator 10 discharges through the resistor 44, and reaches the cut-off point of the tube 46, the latter begins to conduct and its voltage at the anode accordingly drops rapidly to a low value determined by its load resistance and plate-circuit resistance under zero bias conditions. The voltage at the anode of the tube 46 is at $E_b$ when the tube 46 is cut off, and at some lower value when the tube 46 is conducting.

Figure 2C:
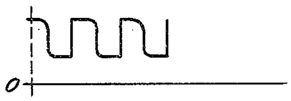

The voltage at the anode of the tube 46, which may have the form shown in Fig. 2*c*, is coupled to the output through a capacitor 50, and the minimum value of the wave is set to zero potential by a conventional direct-current restorer diode 52. The subsequent, low-pass filter 54 averages the wave, and hence its output voltage $e_o$, at terminals 56, 56, is proportional to the fraction of the time that the tube 46 is cut off, which is also the fraction of the time that the capacitor 42 is charged to a greater negative value than that represented by the cut-off voltage of the tube 46.

It will now be shown that the cut-off interval is approximately inversely proportional in duration to the value of the positive input voltage $e_{in}$ at the terminal 45. Fig. 3*a* illustrates graphically the operating conditions when the signal input voltage $e_{in}$ is zero. The capacitor 42 is charged once per cycle of the multivibrator 10 to the maximum negative voltage $E_c$. The values of the capacitor 42 and the resistor 44 are so chosen that the voltage across the capacitor 42 almost, but not quite, reaches $E_{co}$ the cut-off bias for tube 46, in time for the next charging pulse. Hence, the tube 46 is cut-off nearly all the time, when the signal voltage is zero, and $e_o$ is at a maximum.

Figure 3B:
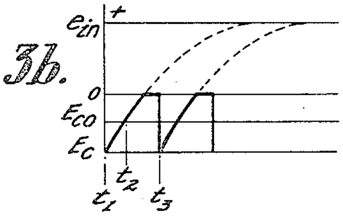

In Fig. 3*b*, there is shown the general case when the signal voltage $e_{in}$ is greater than zero. If $e_c$ is the voltage across capacitor 42, (7) $$e_c = E_c + (e_{in} - E_c)\left(1 - \epsilon^{\frac{-t_2}{RC}}\right)$$

where $\epsilon$=base of natural logarithms, R is resistor 44, and C is capacitor 42. Setting $e_c = E_{co}$, to solve for the time $t_2$, the beginning of conduction in the tube 46, $$E_{co}=E_c+(e_{in}-E_c)\left(1-\epsilon^{\frac{-t_2}{RC}}\right) \quad (8)$$

Solving, $$\epsilon^{\frac{-t_2}{RC}}=\frac{E_{co}-e_{in}}{E_c-e_{in}}$$

If it is stipulated that the time constant RC>>$t_2$, then, very nearly, $$1-\frac{t_2}{RC}=\frac{E_{co}-e_{in}}{E_c-e_{in}} \quad (9)$$

the left hand term being the first two terms of an infinite series representing $$\epsilon^{\frac{-t_2}{RC}}$$

and, $$t_2=RC\frac{E_c-E_{co}}{E_c-e_{in}}$$

If it is also true that $e_{in}>>E_c$, then $$t_2\approx\frac{RC(E_{co}-E_c)}{e_{in}}$$

which is the desired reciprocal relation.

It is thus seen, from an examination of Figs. 3*a* and 3*b*, that the rate of discharge of the capacitor 42 from its maximum negative value $E_c$ to the value $E_{co}$, the sharp cut-ff value for the tube 46, is proportional to the amplitude of the signal input voltage $e_{in}$. The greater the signal input voltage, the sooner capacitor 42 will discharge to the value $E_{co}$, and the smaller the interval $t_1-t_2$, representing the time that the conduction of the tube 46 is cut-off, will be. If the cut-off value $E_{co}$ of the tube 46 is very sharp, as specified, the potential $E_{co}$ may be considered a fixed value, or point at which conduction will take place or be cut-off in the tube 46, depending upon whether capacitor 42 is being discharged or charged, respectively.

Obviously, for small values of $e_{in}$, there is a deviation, since, at these values, $t_2$ is not infinity as called for, but $$t_2\Big|_{e_{in}=0}=RC\left(1-\frac{E_{co}}{E_c}\right)$$

Figure 4:
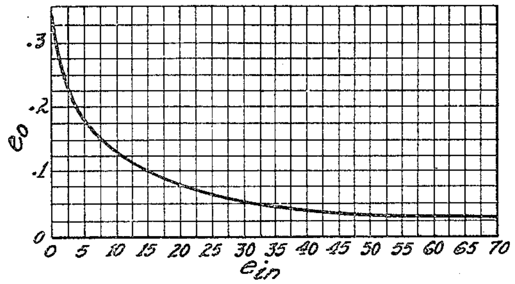
Figure 5:
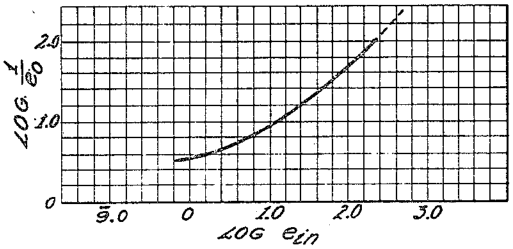

It is shown by the curves in Figs. 4 and 5 that this deviation is actually in the direction of increased similarity to the actual photographic process which the circuit simulates. Fig. 4 shows a curve plotted from Equation 8 for the values $E_{co}=-5$, $E_c=-7$, $RC=59.5\times10^{-6}$, and the multivibrator frequency=50 kc. Fig. 5 shows the same curve plotted to compare with the photographic process, that is, plotting $$\log\frac{1}{e_0}$$

against log $e_{in}$. The deviation from linearity is of the same nature as the usual film "toe" characteristic; hence, the compensation obtained with the circuit would be more nearly correct than if the exact reciprocal relation were maintained.

The output voltage $e_o$, being the reciprocal of the input positive signal $e_{in}$, may be applied to a kinescope used in a flying-spot scanner system. This will produce a negative image on the screen of the kinescope which, when photographed, will give a positive having the same tonal rendition as represented by the input signal $e_{in}$.

It shall be understood that the invention is not limited to the particular embodiment above-described and disclosed, but that changes and modifications may be made within the spirit of the invention.

What is claimed is:

1. A circuit for simulating a photographic process, wherein a fluctuating input voltage is converted to an output voltage which is approximately proportional to the reciprocal of said input voltage, comprising, in combination, means to generate voltage pulses at a frequency higher than the highest frequency component of said input voltage, means to store unidirectional pulses of said voltage pulses, means to discharge said storage means at a rate substantially proportional to the amplitude of said input voltage, said discharge means including an input terminal for receiving said input voltage, and a resistor coupling said input terminal to said pulse store means, means including an electron tube responsive to a predetermined potential of said storage means for producing said output voltage and means for removing frequency components of said output voltage which are above the maximum input voltage frequency.

2. A circuit for simulating a photographic process, wherein a fluctuating, video signal, input voltage is converted to an output voltage which is approximately proportional to the reciprocal of said input voltage, comprising, in combination, means to generate voltage pulses at a frequency higher than the highest frequency component of said input voltage, means to store unidirectional pulses of said voltage pulses, means to discharge said storage means at a rate substantially proportional to the amplitude of said input voltage, said discharge means including an input terminal for receiving said input voltage, and a resistor coupling said input terminal to said pulse store means, means including an electron tube responsive to a predetermined potential of said storage means for producing said output voltage, means for removing frequency components of said output voltage which are above the maximum input voltage frequency, and means for reinserting a direct-current component to the output voltage of said tube.

3. A circuit for simulating a photographic process, wherein a fluctuating signal input voltage is converted to an output voltage which is approximately proportional to the reciprocal of said input voltage, comprising, in combination, means to generate voltage pulses at a frequency higher than the highest frequency component of said input voltage, means to store unidirectional pulses of said voltage pulses, means to discharge said storage means at a rate substantially proportional to the amplitude of said input voltage, means including an electron tube responsive to a predetermined potential of said storage means for producing an output voltage, means for reinserting a direct-current component to the output voltage of said tube, and means for removing frequency components of said output voltage of said tube which are above the maximum signal input voltage frequency.

4. A circuit for simulating a photographic process, wherein a fluctuating signal input voltage is converted to an output voltage which is approximately proportional to the reciprocal of said input voltage, comprising, in combination, means to generate voltage pulses at a frequency higher than the highest frequency component of said input voltage, means to store unidirectional pulses of said voltage pulses, means to discharge said storage means at a rate substantially proportional to the amplitude of said input voltage to provide a voltage signal reciprocally related to said input voltage, and means for removing frequency components of said last-named voltage signal which are above the maximum signal input voltage frequency to provide said output voltage.

5. A circuit for simulating a photographic process comprising, in combination, means for producing a regular train of short voltage pulses, means for differentiating said pulses into voltage peaks, a rectifier and a storage device in series therewith, an electron tube having at least a cathode, a grid, and an anode, means for effecting conduction through said rectifier by unidirectional voltage peaks of the differentiated voltage pulses, and periodically charging said storage device to a fixed value below the cut-off point of said tube, an impedance in series with said storage device, and a source of fluctuating, unidirectional, signal voltage of lower frequency than said regular train of short pulses and of opposite polarity to said unidirectional peaks connected to said impedance for discharging said storage device at a rate proportional to the amplitude of said signal voltage and to a point just above cut-off of said tube, the common junction of said storage device and impedance being connected to said grid, whereby an output voltage is produced at said anode which is approximately inversely proportional to said signal voltage.

6. A circuit for simulating a photographic process comprising, in combination, means for producing a regular train of peaked pulses, a capacitor, means for charging said capacitor by unidirectional peaks of said pulses, a source of fluctuating, unidirectional, signal voltage of opposite polarity to said unidirectional peaks, means for applying said signal voltage to said capacitor and for discharging said capacitor at a rate proportional to the amplitude of said signal voltage, and means including an electron tube for detecting when said capacitor reaches a predetermined state of discharge and for producing conduction through said tube, whereby an output voltage is produced which is approximately inversely proportional to said signal voltage.

7. A circuit for simulating a photographic process, wherein a fluctuating unidirectional signal input voltage is applied to a charging device connected to grid of an electron tube to produce an output voltage which is approximately inversely proportional to said input voltage, comprising means for producing a regular train of short peaked voltage pulses of higher frequency than said input voltage, means for periodically charging said charging device to a fixed potential below cut-off of said tube by unidirectional peaks of said voltage pulses, said unidirectional peaks being of opposite polarity to said signal voltage, and means for gradually and periodically discharging said capacitor to the cut-off point of said tube at the end of a time interval between said unidirectional peaks in the absence of a signal voltage, and for discharging said capacitor to above said cut-off point at a rate proportional to the amplitude of said signal input voltage during any time between said interval when a signal input voltage is present.

8. In a circuit for simulating a photographic process wherein a video signal input voltage is converted to an output voltage which is approximately inversely proportional to said input voltage, an electron tube comprising at least a cathode, a grid and an anode, a capacitor connected to said grid, means for periodically charging said capacitor to a value below cut-off of said tube, and means for applying said input voltage to said capacitor and for discharging said capacitor at a rate proportional to the amplitude of said input voltage to a point above the cut-off value whereby said tube will conduct and produce said output voltage at said anode.

9. A circuit for simulating a photographic process wherein a fluctuating input voltage is converted to an output voltage which is approximately proportional to the reciprocal of said input voltage, said circuit comprising a capacitive storage device, means for charging said storage device at a regular rate higher than the highest rate of fluctuation of said input voltage, an input terminal for receiving said fluctuating input voltage, impedance means coupling said input terminal to said storage device for discharging said storage device at a fluctuating rate determined by the amplitude of said input voltage, means responsive to the charge remaining in said storage device for producing voltage signals representative thereof, and means for averaging said representative signals to produce said reciprocally proportional output voltage.

10. A circuit for simulating a photographic process as recited in claim 9 wherein said charge responsive means for producing representative voltage signals includes means for producing a voltage signal of zero amplitude when said remaining charge is less than a predetermined magnitude and a voltage signal of maximum amplitude when said remaining charge is greater than said predetermined magnitude, said impedance means discharging said capacitive storage means to said predetermined magnitude of remaining charge when said input voltage amplitude is zero, whereby said output signal is proportional to the time said remaining charge is greater than said predetermined magnitude.

References Cited in the file of this patent

UNITED STATES PATENTS

| Number | Name | Date |
| --- | --- | --- |
| 2,016,147 | La Pierre et al. | Oct. 1, 1935 |
| 2,350,069 | Shrader et al. | May 30, 1944 |
| 2,572,179 | Moore | Oct. 23, 1951 |